(12) United States Patent
Snyder et al.

(10) Patent No.: US 7,835,984 B2
(45) Date of Patent: Nov. 16, 2010

(54) INTERCOMPANY LOAN MANAGEMENT SYSTEM

(75) Inventors: Norman M. Snyder, Charlotte, NC (US); Joe D. Brinson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 972 days.

(21) Appl. No.: 11/160,425

(22) Filed: Jun. 23, 2005

(65) Prior Publication Data

US 2006/0294003 A1 Dec. 28, 2006

(51) Int. Cl.
*G07B 17/00* (2006.01)
*G07F 19/00* (2006.01)
*G06Q 40/00* (2006.01)

(52) U.S. Cl. .............................. 705/38; 705/30; 705/35; 705/40

(58) Field of Classification Search .................... 705/38, 705/30, 35, 40
See application file for complete search history.

(56) References Cited

U.S. PATENT DOCUMENTS 4,774,664 A * 9/1988 Campbell et al. ............. 705/38
7,647,272 B1 * 1/2010 Muren ......................... 705/38
2001/0054022 A1 * 12/2001 Louie et al. ................... 705/38
2002/0152155 A1 * 10/2002 Greenwood et al. .......... 705/38

OTHER PUBLICATIONS

Keeping the Books, 3rd Edition by Linda Pinson and Jerry Jinnett, Upstart Publishing Company, Chicago Illinois, 1996. pp. 13-24.*
Bank of America Corporation, International Application No. PCT/US06/23389, "International Search Report", Feb. 9, 2007.
Bank of America Corporation, International Application No. PCT/US06/23389, "Written Opinion", Feb. 9, 2007.

* cited by examiner

*Primary Examiner*—James P Trammell
*Assistant Examiner*—Shahid R Merchant
(74) *Attorney, Agent, or Firm*—Michael A. Springs; Moore & Van Allen PLLC

(57) ABSTRACT

The present invention is a computer based intercompany loan system (ICLS) for managing multiple intercompany loans between various lender companies and various borrower companies. The ICLS includes a loan manager module for setting up and maintaining a loan between a borrower and a lender. The ICLS also includes a batch processing module for receiving and processing general ledger entries representing loan events to facilitate automatic intercompany settlement. In addition, ICLS provides an administrative module for defining and managing the access and privileges of users with respect to the computer based intercompany loan system, and maintaining general ledger tables.

26 Claims, 3 Drawing Sheets

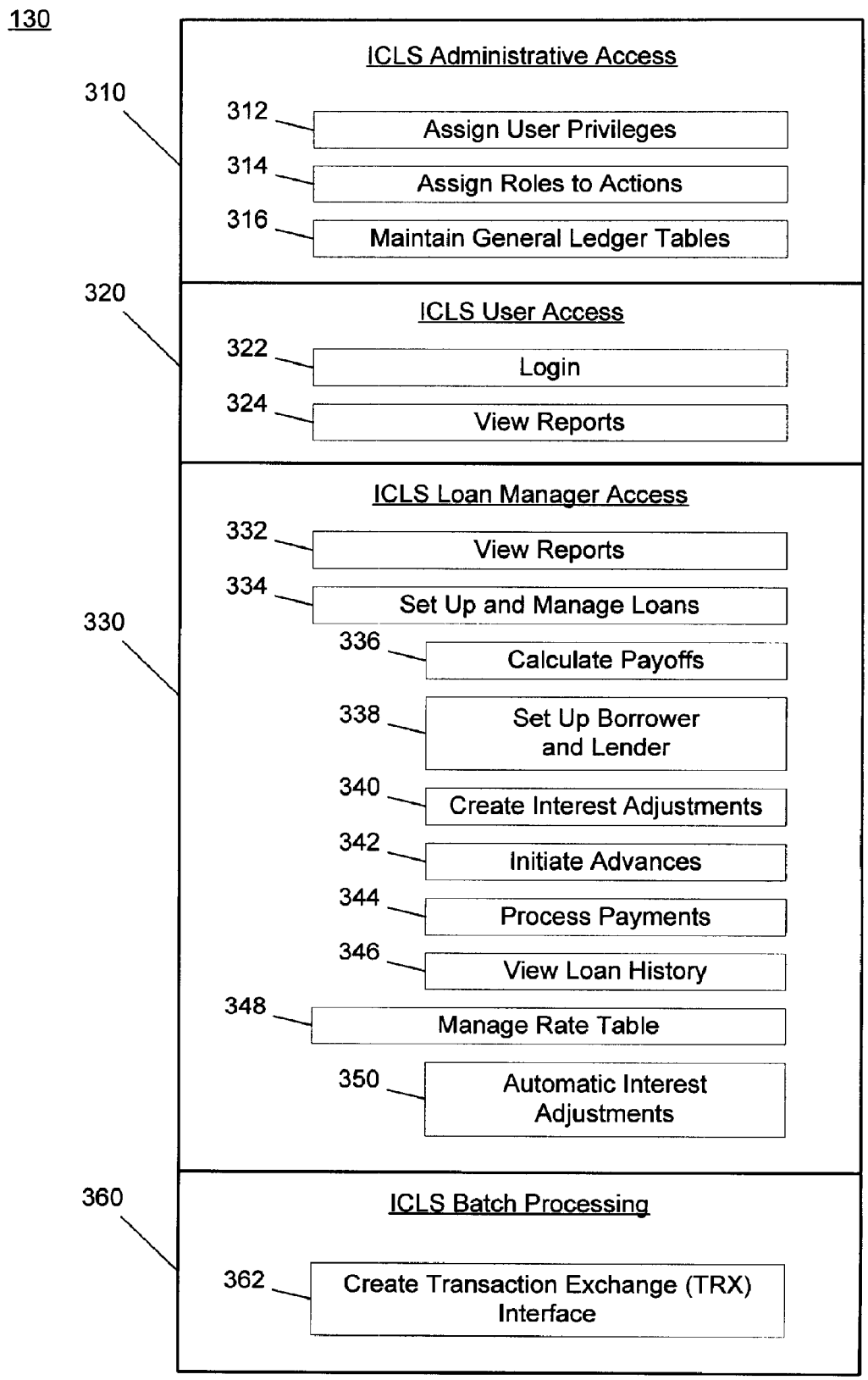

INTERCOMPANY LOAN MANAGEMENT SYSTEM

BACKGROUND OF INVENTION

Tracking intercompany loans within an organization is a necessary and often laborious task. Current computer assisted techniques and software are not as robust as one would like and have several limitations that must be individually addressed. For instance, the computer software typically runs on a platform that is not a bank-standard system. In addition, the current systems do not accommodate loans having credit limits exceeding one billion dollars. This requires administrators to partition a large loan into several smaller loans under the one billion dollar cap. The current systems do not provide a general ledger interface for daily or monthly transactions. Administrators are required to manually key such general ledger entries into the system. Interest charges are also manually processed as well as all month-end processing including verification of interest rates and general ledger processing.

What is needed is a system that addresses the aforementioned shortcomings of current intercompany loan tracking and maintenance systems.

SUMMARY OF INVENTION

The present invention is a computer based intercompany loan system (ICLS) for managing multiple intercompany loans between various lender companies and various borrower companies. The ICLS includes a loan manager module for receiving and storing initial loan terms between a borrower company and a lender company, processing payment advances and creating a general ledger entry to reflect the payment advance, processing interest payments and creating a general ledger entry to reflect the interest payment, processing principal payments and creating a general ledger entry to reflect the principal payment, calculating loan payoff amounts, and receiving, processing, and storing interest rate adjustments wherein accrued and current interest for a loan are automatically recalculated when adjustments to an interest rate are received and processed. The loan manager module also manages a master interest rate table to allow interest rate adjustments to be entered so that loans depending on interest rates that have been adjusted can have their interest payments re-calculated.

The ICLS also includes a batch processing module for receiving general ledger entries, storing the general ledger entries in a general ledger transaction warehouse, extracting general ledger entries from the general ledger transaction warehouse, and formatting the general ledger entries for input into a transaction exchange system that is tasked to perform intercompany settlement.

In addition, ICLS provides an administrative module for defining and managing the access and privileges of users with respect to the computer based intercompany loan system, and maintaining general ledger tables.

Another feature of the ICLS is its user access module that allows a borrower or a lender limited access to the computer based intercompany loan system for purposes of creating, viewing, and downloading ad-hoc electronic reports for loans to which they are a party. Moreover, the ad-hoc electronic reports can be formatted to be readable by third party database software.

The system of the present invention can be implemented as a complete system including the computer equipment used to host and execute the ICLS software or as a computer program product that can be loaded onto an existing computer platform.

BRIEF DESCRIPTION OF DRAWINGS

FIG. 3 is a detailed listing of the functions that can be performed by the ICLS software tool.

DETAILED DESCRIPTION

Figure 1:
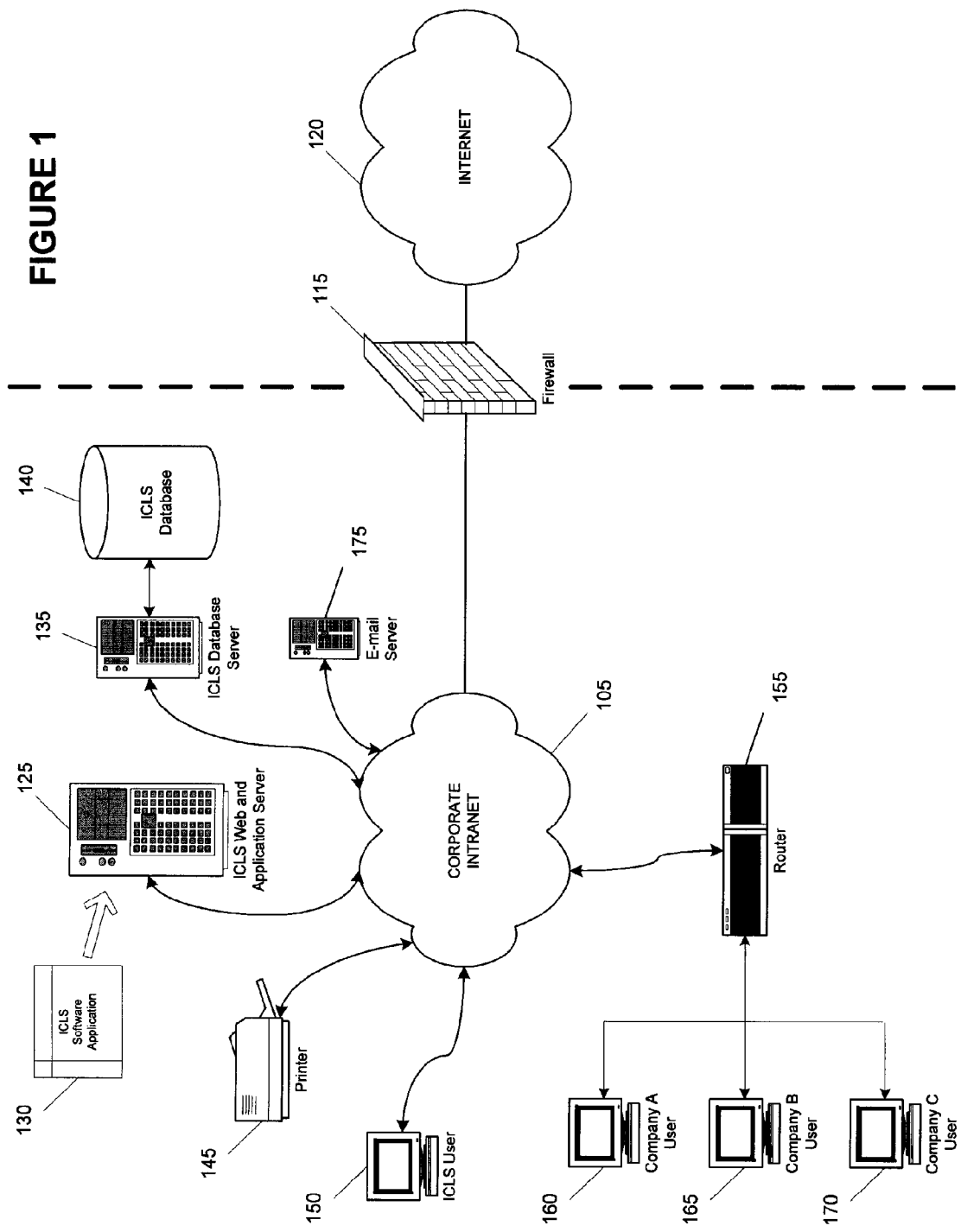
FIG. 1 illustrates the environment, systems and hardware in which the present invention operates.

It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps. With respect to flow charts, block diagrams, and flow diagrams, not every possible signal flow, data path or process block is shown. Rather, for clarity, only those important to the inventive concepts being discussed relative to the drawing may be illustrated, although others may be discussed.

It should be understood that terms like "bank," "financial institution," and just "institution" if used herein are used in their broadest sense. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems [or even a single work station] if appropriate databases are present and can be accessed.

The present invention, dubbed the InterCompany Loan System (ICLS), provides for principal and interest tracking for loans made from one company to another company within a franchise. In general, this loan system performs principal advances, allows principal payments, allows interest due payments, and assesses interest charges.

The ICLS also provides an automated interface to another system that produces intercompany settlement. Prior to the installation of the ICLS, loan managers had to calculate and book general ledger entries manually. The ICLS determines the general ledger account number for each type of activity (advance, payment, etc.) from a table-driven combination of factors, including whether the loan is short-term, long-term, or subordinated debenture, and whether the loan is capitalized.

For each type of loan (short term, long-term, subordinated debenture), and for each elimination point (intercompany bank, intercompany non-bank, etc.), and, depending on whether the loan is capitalized or not, the ICLS creates general ledger transactions. The transactions are not merely for the current day. For some types of activity, the transactions are for the last business day of this month or the first business day of next month. The ICLS holds the future transactions in a local warehouse until the calendar advances to the appropriate day. Heretofore, an intercompany loan department had to track this activity manually and key the entries on the exact day, pursuant to activity that may have occurred weeks prior.

Intercompany loans can be pegged to any of various loan indices—LIBOR, PRIME, etc. Moreover, ICLS loan managers may create custom rate types and treat the created types identically to more traditional rates. If the intercompany loan department changes a rate in the past, the ICLS automatically adjusts the accrued interest for all loans pegged to that rate. For example, if LIBOR6 is carried as 1.42% as of September $1^{st}$, and 1.45% as of September $22^{nd}$, but the system administrators change the latter to 1.45% as of September $15^{th}$, the system will automatically adjust loans pegged to LIBOR6, by 0.03%, for the intervening seven days.

For interest due payments and interest charges, the ICLS generates emails to any parties listed as contacts for the borrowers and lenders of the affected loans.

The ICLS also offers an ad-hoc query capability, results from which can be downloaded. The ICLS provides any user with the ability to produce on-line reports and to download those reports into a spreadsheet. For those in the role of borrower or lender, however, the view is limited to loans for which they are listed as contact.

The user interface is web browser based and the ICLS is built upon platform-independent technology such as, for instance, Java 2 Enterprise Edition. Thus, the entire ICLS could run on as small a platform as a single PC, or as large a platform as a mainframe.

FIG. 1 illustrates the environment, systems and hardware in which the present invention operates. The intercompany loan tracking tool (ICLS) of the present invention is a computer based system. The ICLS application 130 will typically reside on an ICLS web/application server 125 within a corporate intranet network 105. The corporate intranet 105 can have access to the Internet 120 but will be shielded by a firewall 115 for security purposes. The firewall 115 is designed to prevent unauthorized access to intranet computers and data from external sources. There is also an ICLS database server 135 and corresponding ICLS database 140 for storing and maintaining ICLS data as created and manipulated by the ICLS application 130 resident on the ICLS web/application server 125.

There are a variety of other computer peripheral and network devices accessible to the ICLS application 130 that assist ICLS functionality. For instance, an e-mail server 175 interacts with the ICLS application 130 to facilitate data exchanges between borrowers, lenders and system administrators. Multiple terminals 160, 165, 170, network routers 155, and printers 145 are available to communicate and exchange data with the ICLS application 130.

Figure 2:
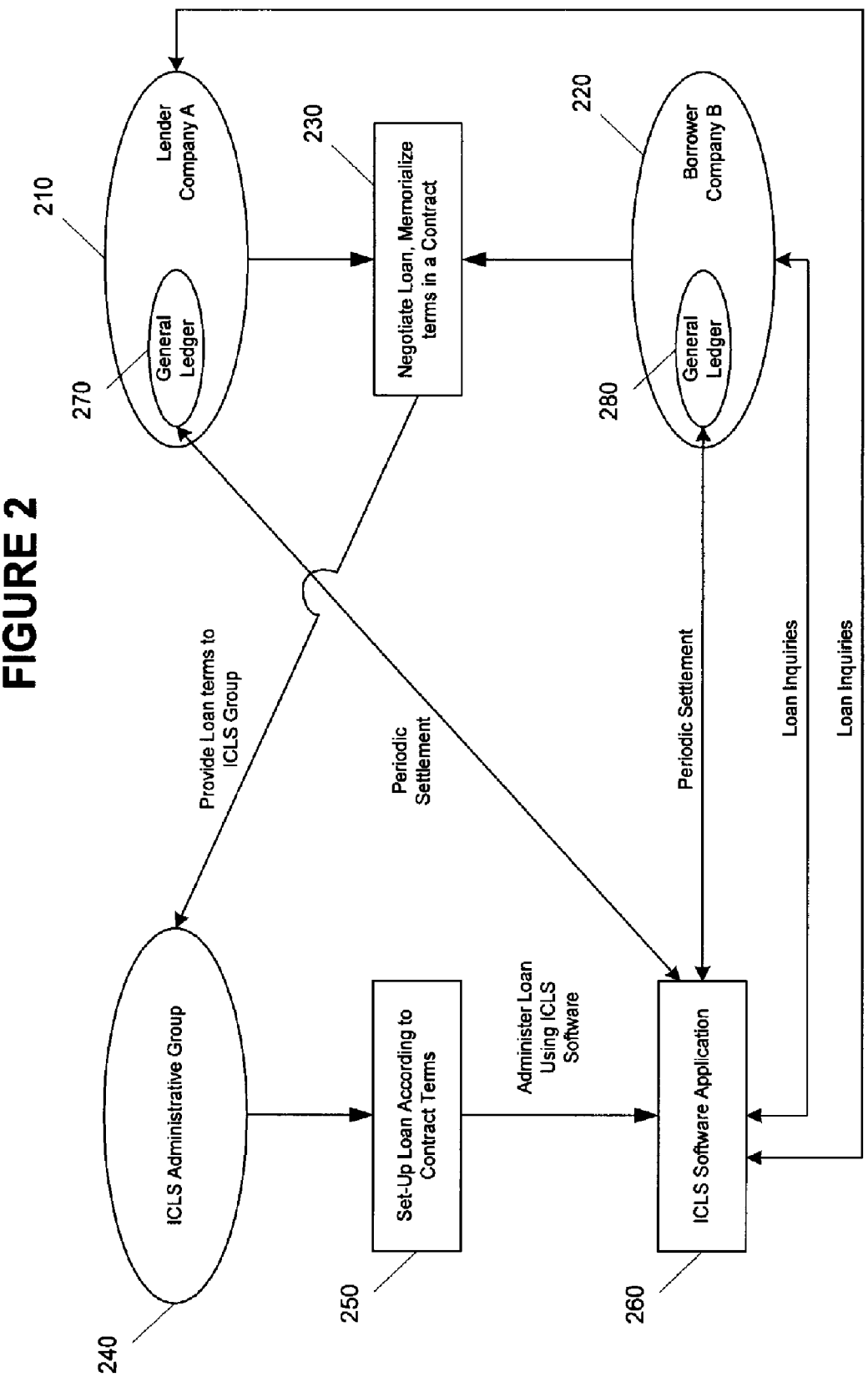
FIG. 2 is a functional block diagram of the present invention.

FIG. 2 is a functional block diagram of the present invention in which the process of initiating, entering, processing, and maintaining an intercompany loan is described. The process starts with a borrower 220 and a lender 210 negotiating the terms of a loan 230. The agreement is memorialized and forwarded to an ICLS administrative group 240. The ICLS administrative group 240 then sets up the loan 250 within the ICLS software application 260 according to the terms of the agreement. The new loan is then managed by the ICLS software application 260 under the guidance of the appropriate ICLS administrative personnel. The ICLS software application 260 then performs periodic settlements by directly accessing the general ledger 280 of the borrower 220 and the general ledger 270 of the lender 210. The periodic settlement dates are set in the original loan agreement but are subject to change if the parties agree. Moreover, the loan agreement itself can cause changes to material terms of the loan if preset conditions are triggered.

In such cases, the ICLS administrative personnel can input the new loan terms and the ICLS software application can adjust its processing accordingly and automatically. This can include automatic e-mail notifications to the relevant borrower and lender personnel. The ICLS also provides an inquiry function that supports inquiries into the loan status from either the borrower or lender. The information sought and provided is constrained to that authorized by ICLS administrators.

FIG. 3 is a detailed listing of the functions that can be performed by the ICLS software tool. The ICLS can be logically divided into four types of user-oriented service. These include administrative access 310, user access 320, loan manager access 330, and batch processing 340.

Administrative access 310 describes the role of ICLS administrative personnel in using the ICLS tool 130. ICLS administrative personnel have top level access to the ICLS and its data. These individuals are responsible for, inter alia, assigning user privileges 312, assigning roles to actions 314, and maintaining the general ledger tables 316.

Assigning user privileges 312 encompasses initially establishing an individual's access to the ICLS, establishing a login ID and password, and providing for appropriately limited access to the ICLS by designating what role(s) that user possesses 314. In turn, each role is assigned to one or more actions. Maintaining the general ledger tables of the borrow and lender companies encompasses the act of designating which general ledger account will be affected by the various loan activities (e.g., payments, advances) according to the loan parameters, namely loan type, elimination point, and whether the loan is capitalized. Thus, the ICLS administrative personnel are the gatekeepers of the ICLS.

User access 320 describes the functions that can be performed by a client be it a borrower or a lender. User access 320 is the most passive type of ICLS access in that users can not edit or change anything in the ICLS. Users merely have limited read-only access to the ICLS. User access 320 is limited to loans to which the user is a party. These limitations are established by the ICLS administrative personnel when their ICLS account is created. If a user has multiple loans maintained by the ICLS, the administrative personnel can allow each loan to be linked to the user's account. To obtain loan information, a user must login 322 to the ICLS using an ID and password supplied by ICLS administrative personnel. Once logged in, the user can perform ad-hoc queries to the ICLS database and receive database reports 324 in return containing the loan information requested.

Before a user (lender or borrower) can access loan information, the loan must be set up within the ICLS. This is performed by a second group of ICLS personnel called loan managers. Loan manager access 330 encompasses a wide variety of tasks and functions. In addition to the passive function of viewing reports 332, loan managers use the ICLS to set up and manage loans 334 and manage each loan's rate table 348.

Setting up and managing a loan 334 includes tasks like payoff calculation 336, data input to set up the borrower and lender 338, creating interest rate adjustments to a loan 340, initiating advance payments 342, processing borrower payments 344, and viewing a loan's history 346 for both borrower and lender.

Managing the rate table 348 for a loan involves checking on automatic interest rate adjustments 350. Such adjustments may be the result of a triggering condition that was built into the loan when it was initially set up by the loan manager. The terms of the automatic adjustment would have been agreed to by the borrower and lender ahead of time and the loan manger would have entered the automatic adjustment into the ICLS for that loan.

The fourth type of service offered by the ICLS 130 is batch processing 360. Batch processing 360 encompasses creating a transaction exchange interface 362 in order to process the day's principal advances, principal payments, interest due payments and interest charges so that the data can be posted to the general ledgers of the borrower and lender appropriately, meanwhile performing Intercompany settlement, so that each company's individual general ledger remains in balance.

The foregoing description provides a detailed functional overview of the ICLS. To better understand the ICLS as it relates to the description above, a use case is presented that describes a loan being serviced by the ICLS. The use case will be primarily from the perspective of an ICLS loan manager. It is assumed that the administrative personnel have already set up and provisioned the proper account and privilege data into the ICLS.

The first step is to create the loan within the ICLS. To do so, the loan manager will utilize loan data that has been negotiated and agreed to by the borrower and lender. This data is then entered into the ICLS. The data includes, but is not limited to, borrower/lender ID, borrower/lender name, borrower/lender state, loan type, maturity date, general ledger data, borrower/lender e-mail contacts, loan amount or credit line, interest rate ID, interest rate name, interest rate schedules, capitalized interest, interest payment frequency, interest payment date, DIY value, tax exempt status, and elimination point. Once entered, the ICLS stores the data in the ICLS database. The loan manager is assisted in data input via a series of web browser forms that guide the creation of the loan. If the borrower and/or lender are already in the ICLS, a lot of the information is pre-filled into the forms.

Once the loan has been created, the loan manager can perform various tasks associated with the loan. In addition, the borrower or lender can access the loan via the ICLS for purposes of viewing reports pertaining to the loan. To access a particular loan, the loan manager, via the web-based ICLS user interface, selects the loan to be managed via loan ID, lender/borrower ID or name, or some other unique identifier of the loan.

One significant task of the loan manager is to enter and maintain interest rate changes to the master interest rate table. To do so, the loan manager browses or navigates through the web-based ICLS user interface and selects a task associated with interest rates. This will present of variety of options to the loan manager including a search option in which the loan manager can enter one or more interest rate criteria into a search form. Criteria include rate ID and rate name including, but not limited to, Prime Rate, various LIBOR rates, Federal Fund rates, and custom rates.

The ICLS will return a list of interest rates that meet the search criteria. The loan manager can select one of the listed interest rates and ICLS will present a form to allow the effective date and rate to be altered. Once altered, ICLS will automatically invoke an interest adjustment to the loans pegged to the changed interest rate.

The loan manager may also create a custom rate rather than selecting an existing rate. ICLS presents a form that offers fields for the loan manager to input the newly created rate to be used for the loan including effective date and an interest rate. ICLS then stores the new rate and automatically invokes an interest adjustment to any loans to be associated with the new rate.

Whenever an interest rate changes for a loan for a date in the past, ICLS will re-calculate current interest for any loans that depended on that rate. Thus, changing a rate in the master interest rate table can affect multiple loans. In practice, ICLS will compute the proper accrued and current interest based on the rates in the master interest rate table. ICLS then compares the computed amount to a previously stored amount. If the computed and stored amounts differ, an interest adjustment is created and affected loans have their accrued and current interest amounts appropriately adjusted to reflect the new rate.

Each business day, ICLS accrues interest for each loan by multiplying the principal times the rate and dividing by the days-in-year (DIY) for that loan.

The loan manager can also process a loan advance against available credit. The loan manager will navigate the ICLS user interface to select the loan to process an advance. The ICLS will then display the principal outstanding and available credit. The loan manager then inputs the amount to advance. The ICLS then e-calculates the principal outstanding and available credit and processes and logs the transaction. ICLS will prevent any advances that exceed the available credit limit.

Principal payments can also be processed by the loan manager. Similar to the above, the loan manager will navigate ICLS and select a loan to process a principal payment. The outstanding loan balance will be displayed and the loan manager enters an amount to be paid against the balance. ICLS will then re-calculate the outstanding balance and a new credit limit. The transaction is then processed and logged accordingly.

Interest payments for the current day are another task of the loan manager. The loan manager enters a due date (or range of due dates) as well as whether the report is to be produced by the borrower or the lender. ICLS provides all loans that have interest due dates meeting the specified criteria entered above, the amount of the interest due (accrued+current) by loan, and a list of contacts for either borrower or lender. The loan manager can initiate e-mails to the contacts of loans having interest due that day. The loan manager can also process interest payments. In processing an interest payment, ICLS will create general ledger entries for receipt of payment, zero accrued interest and current interest, create general ledger entries for end-of-month (EOM) processing and create a transaction history of actions just performed.

The loan manager can also post interest charges accordingly. The loan manager selects an option to view interest charges and ICLS responds with a list of all loans having interest charges according to loan ID and total interest charge for that period. The loan manager reviews the results and if satisfied will select to post the charges. ICLS then posts the interest charges to the loans, increases the outstanding balances on capitalized loans, creates general ledger entries, and creates a historical transaction record that includes total interest charge, current interest amount, and interest adjustment amount.

One of the most unique aspects of the ICLS is its batch processing and ability to interface with the general ledgers of clients. Each night, during the batch processing window, ICLS scans its own history for principal payments, principal advances, interest due payments, and interest charges and creates corresponding general ledger entries for the current day. If designated by a general ledger look-up table, ICLS offsets for either the last day of the current month or the first day of the next month. The transactions are then placed into a local general ledger transaction warehouse. ICLS then extracts all activity with effective dates prior to or equal to the present day from the general ledger transaction warehouse. ICLS formats the transactions for input to the Transaction Exchange system (TRX). TRX then performs intercompany settlement and is forwarded to the appropriate general ledgers for posting.

ICLS provides for ad-hoc queries and reports as determined by user privileges. Reports can be downloaded into other third party database software systems such as Microsoft Excel™. Some of the reports include, but are not limited to, new loans report, loan activity report, loan maintenance report, general ledger transaction report, interest adjustment report, loan payoff calculation report, loan maturity report, and current loan status report.

The present invention addresses many shortcomings of the prior art. The ICLS has no limitation on daily closings, provides an automatic interface to a general ledger, provides for automatic interest due payments, allows for optional emails to the contact personnel for the affected loans, performs automatic interest charges, provides inquiry and reporting tools for borrowers and lenders, and is built on a bank standard platform.

It should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media could be a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device.

Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

What is claimed is:

1. A computer based intercompany loan system for managing multiple intercompany loans between various lender companies and various borrower companies comprising:
    a memory device comprising computer readable program code stored thereon; and
    a processing device operatively coupled to the memory device and configured to execute the computer readable program code for:
        receiving and storing initial loan terms for a loan including a loan type, an interest rate, an elimination point, and whether the loan is capitalized, wherein the initial loan terms are agreed to by a borrower company and a lender company;
        processing a payment advance and creating a general ledger entry for the borrower company and the lender company to reflect the payment advance by accessing individual systems of the borrower company and the lender company;
        processing an interest payment and creating a general ledger entry for the borrower company and the lender company to reflect the interest payment by accessing the individual systems of the borrower company and the lender company;
        processing a principal payment and creating a general ledger entry for the borrower company and the lender company to reflect the principal payment by accessing the individual systems of the borrower company and the lender company;
        calculating a loan payoff amount; and
        receiving, processing, and storing an interest rate adjustment wherein accrued and current interest for the loan are automatically re-calculated when an adjustment to the interest rate is received and processed.

2. The computer based intercompany loan system of claim 1 wherein the processing device is further configured to execute the computer readable program code for:
    receiving general ledger entries;
    storing the general ledger entries in a general ledger transaction warehouse;
    extracting the general ledger entries from the general ledger transaction warehouse;
    formatting the general ledger entries for input into a transaction exchange system that is tasked to perform intercompany settlement; and
    performing intercompany settlement by accessing the individual systems of the borrower company and the lender company.

3. The computer based intercompany loan system of claim 1 wherein the processing device is further configured to execute the computer readable program code for:
    defining and managing the access and privileges of users with respect to the computer based intercompany loan system; and
    maintaining general ledger tables.

4. The computer based intercompany loan system of claim 1 wherein the processing device is further configured to execute the computer readable program code for managing a master interest rate table to allow the interest rate adjustment to be entered so that the loan depending on the interest rate that has been adjusted, can have its interest payment re-calculated.

5. The computer based intercompany loan system of claim 1 wherein the processing device is further configured to execute the computer readable program code for automatically electronically notifying the borrower company or the lender company when certain events have occurred.

6. The computer based intercompany loan system of claim 5 wherein events include interest rate adjustments, interest due payments, advance payments, principal payments, and interest payments.

7. The computer based intercompany loan system of claim 1 wherein the processing device is further configured to execute the computer readable program code for:
    allowing the borrower company or the lender company limited access to the computer based intercompany loan system for purposes of creating, viewing, and downloading ad-hoc electronic reports for loans to which they are a party.

8. The computer based intercompany loan system of claim 7 wherein the ad-hoc electronic reports can be formatted to be readable by third party database software.

9. The computer based intercompany loan system of claim 1 wherein the interest rate is a custom rate.

10. A non-transitory computer readable medium having stored thereon a computer program code, the computer program code including instructions for managing multiple intercompany loans between various lender companies and various borrower companies which, when executed by a processor, causes the processor to perform the method comprising:

receiving and storing initial loan terms for a loan including a loan type, an interest rate, an elimination point, and whether the loan is capitalized, wherein the initial loan terms are agreed to by a borrower company and a lender company;

processing a payment advance and creating a general ledger entry for the borrower company and the lender company to reflect the payment advance by accessing individual systems of the borrower company and the lender company;

processing an interest payment and creating a general ledger entry for the borrower company and the lender company to reflect the interest payment by accessing the individual systems of the borrower company and the lender company;

processing a principal payment and creating a general ledger entry for the borrower company and the lender company to reflect the principal payment by accessing the individual systems of the borrower company and the lender company;

calculating a loan payoff amount; and receiving, processing, and storing an interest rate adjustment wherein accrued and current interest for the loan are automatically re-calculated when an adjustment to the interest rate is received and processed.

11. The non-transitory computer readable medium of claim 10, wherein the method further comprises:

receiving general ledger entries;

storing the general ledger entries in a general ledger transaction warehouse;

extracting the general ledger entries from the general ledger transaction warehouse;

formatting the general ledger entries for input into a transaction exchange system that is tasked to perform intercompany settlement; and performing intercompany settlement by accessing the individual systems of the borrower company and the lender company.

12. The non-transitory computer readable medium of claim 10, wherein the method further comprises:

defining and managing the access and privileges of users with respect to the computer based intercompany loan system; and maintaining general ledger tables.

13. The non-transitory computer readable medium of claim 10, wherein the method further comprises managing a master interest rate table to allow the interest rate adjustment to be entered so that the loan, depending on the interest rate that has been adjusted, can have its interest payments re-calculated.

14. The non-transitory computer readable medium of claim 10, wherein the method further comprises automatically electronically notifying the borrower company or the lender company when certain events have occurred.

15. The non-transitory computer readable medium of claim 14 wherein events include interest rate adjustments, interest due payments, advance payments, principal payments, and interest payments.

16. The non-transitory computer readable medium of claim 10, wherein the method further comprises enabling the borrower company or the lender company to create, view, and download ad-hoc electronic reports for loans to which they are a party.

17. The non-transitory computer readable medium of claim 16, wherein the method further comprises formatting the ad-hoc electronic reports to be readable by third party database software.

18. An intercompany loan system for managing multiple intercompany loans between various lender companies and various borrower companies, the system comprising:

a memory device comprising computer readable program code stored thereon; and a processing device operatively coupled to the memory device and configured to execute the computer readable program code for:

receiving and storing initial loan terms for the intercompany loans, that initial loan terms including for each intercompany loan a loan type, an interest rate, an elimination point, and whether the loan is capitalized, wherein the initial loan terms are agreed to by a borrower company and a lender company;

processing payment advances, interest payments, or principal payments;

accessing a borrower general ledger on computer systems of the borrower company;

accessing a lender general ledger on computer systems of the lender company; and creating general ledger entries for the borrower general ledger and the lender general ledger on the computer systems of the borrower company and lender company to reflect the payment advances, interest payments, or principal payments.

19. The intercompany loan system of claim 18, wherein the processing device is further configured to execute computer readable program code for:

receiving, processing, and storing interest rate adjustments wherein accrued and current interest for an intercompany loan are automatically re-calculated when adjustments to the interest rate are received and processed.

20. The intercompany loan system of claim 18, wherein the processing device is further configured to execute the computer readable program code for:

storing the general ledger entries in a general ledger transaction warehouse;

extracting the general ledger entries from the general ledger transaction warehouse;

formatting the general ledger entries for input into a transaction exchange system that is tasked to perform intercompany settlement; and performing intercompany settlement by accessing the borrower general ledger and the lender general ledger.

21. The intercompany loan system of claim 18, wherein the processing device is further configured to execute the computer readable program code for:

defining and managing the access and privileges of users with respect to the computer based intercompany loan system; and maintaining general ledger tables.

22. The intercompany loan system of claim 18, wherein the processing device is further configured to execute the computer readable program code for:

managing a master interest rate table to allow interest rate adjustments to be entered so that the intercompany loans depending on the interest rates that have been adjusted, can have their interest payments re-calculated.

23. The intercompany loan system of claim 18, wherein the processing device is further configured to execute the computer readable program code for:

automatically electronically notifying the borrower company or the lender company when certain events have occurred.

24. The intercompany loan system of claim 23, wherein events include interest rate adjustments, interest due payments, advance payments, principal payments, and interest payments.

25. The intercompany loan system of claim 18, wherein the processing device is further configured to execute the computer readable program code for:

allowing a user from the borrower company and the lender company limited access to the intercompany loan system for purposes of creating, viewing, and downloading ad-hoc electronic reports for the intercompany loans to which they are a party.

26. The intercompany loan system of claim 25, wherein the ad-hoc electronic reports can be formatted to be readable by third party database software.

\* \* \* \* \*